July 15, 1930.  J. G. BARBOUR  1,770,830

TRICKLING FILTER FLOOR CONSTRUCTION

Filed Nov. 15, 1927  2 Sheets-Sheet 1

Inventor

James G. Barbour

By Freark and Bond

Attorneys

July 15, 1930. J. G. BARBOUR 1,770,830
TRICKLING FILTER FLOOR CONSTRUCTION
Filed Nov. 15, 1927 2 Sheets-Sheet 2

Inventor
James G. Barbour
By Frease and Bond
Attorneys

Patented July 15, 1930

1,770,830

UNITED STATES PATENT OFFICE

JAMES G. BARBOUR, OF CANTON, OHIO, ASSIGNOR TO THE METROPOLITAN PAVING BRICK COMPANY, OF CANTON, OHIO, A CORPORATION OF OHIO

TRICKLING-FILTER FLOOR CONSTRUCTION

Application filed November 15, 1927. Serial No. 233,387.

The invention relates to improvements in false or open floor construction for trickling filter beds and more particularly to improvements in the trickling filter floor construction set forth in my prior Patent No. 1,601,465; and the objects of the present improvements are to provide special shapes and an arrangement of the trough tile and grid blocks by which a permanent floor can be constructed for supporting the filter bed according to my aforesaid patent.

A trickling filter bed may be made of coarse material such as clinker, gravel or broken stone, through which sewage effluent may trickle in thin films for aerating and purifying the same before it is discharged into an open water course.

In the use of such filters, difficulty is experienced in the accumulation and adhesion of suspended solids and organic growths in the open floor and drainage system, which not only prevents the free flow of purified effluent therethrough, and may also recontaminate the same, but may require the entire filter bed to be removed for cleaning and purifying the floor and drainage openings.

These difficulties are accentuated when the floor and drainage structure are made of concrete or other granular or porous material, because the same gives a very good anchorage for fungous growth and is also subject to disintegration by the ordinary physical reaction and the chemical reaction of the sewage effluent.

The most desirable and efficient form of floor construction for such filter beds includes the use of a drainage trough sub-structure, and a grid block superstructure; and it is the purpose of the present invention to build such structures out of special shaped vitreous tile and blocks, which can be laid upon a concrete bed and serve to avoid the difficulties of construction and use which have attended other forms of floor construction.

A preferred embodiment of the present invention is illustrated in the accompanying drawings forming part hereof, in which—

Figure 1:
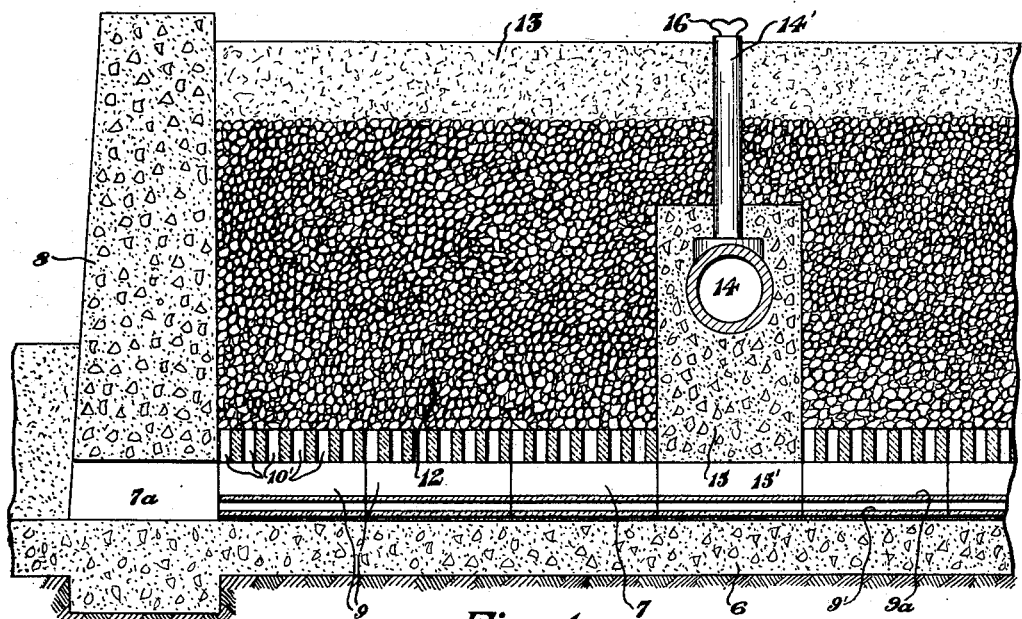
Figure 2:
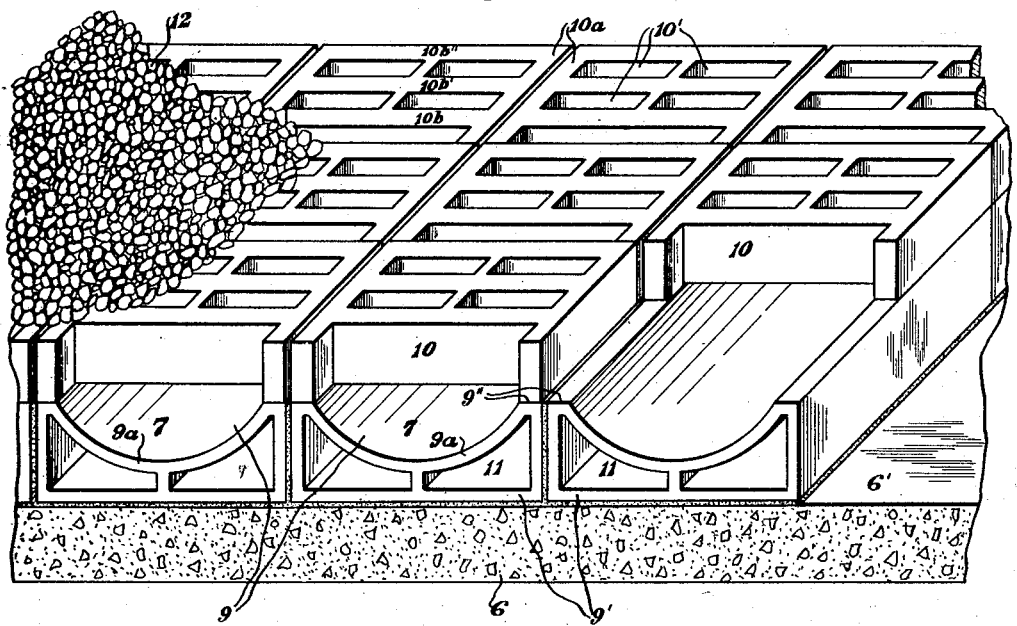
Figure 3:
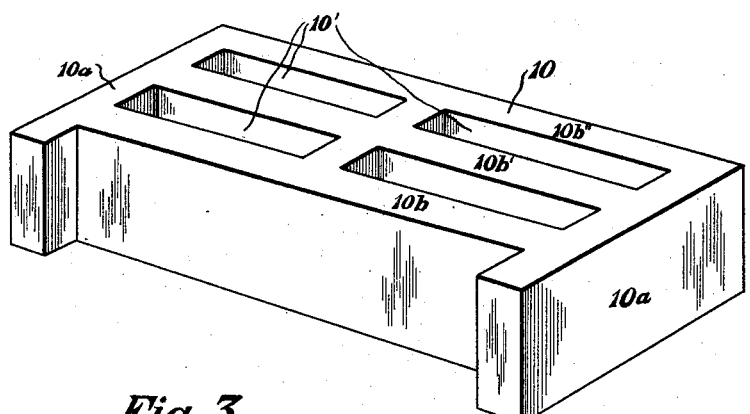
Figure 4:
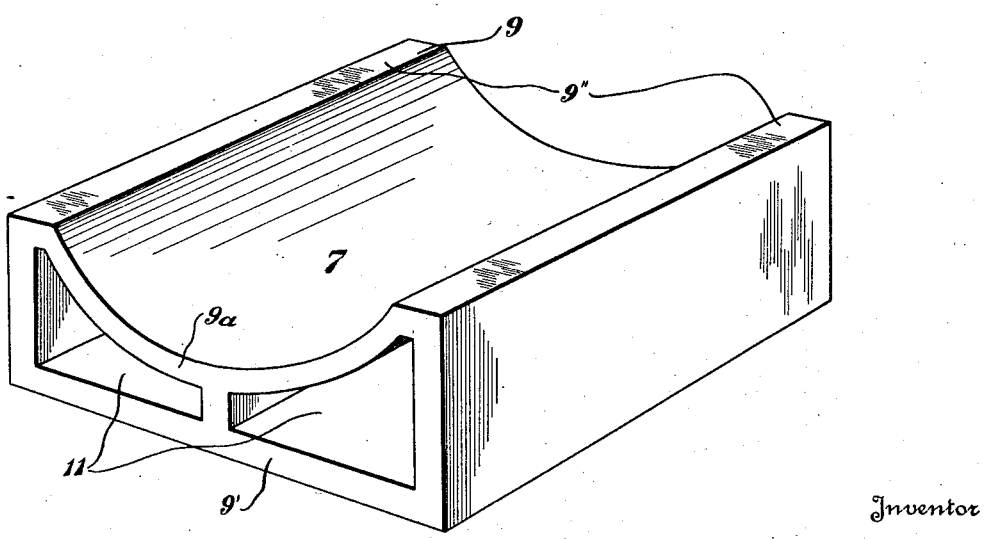

Figure 1 is an elevation section along one of the drainage troughs showing the grid blocks in cross section;

Fig. 2, a fragmentary perspective view showing details of the floor construction;

Fig. 3, a detached perspective view of one grid block;

Fig. 4, a detached perspective view of one trough tile;

Similar numerals refer to similar parts throughout the drawings.

A cement or concrete bed 6 may first be laid upon the ground, and the same should be of sufficient thickness and upon a suitable foundation for supporting the entire load of the floor structure and filter bed imposed upon it.

The surface 6' of the concrete bed should be finished in a smooth plane, with a sufficient slope or inclination lengthwise of the drainage troughs 7 to insure a prompt and free flow of purified effluent along the same, to a suitable outlet 7ª which may be provided in the base of the end wall 8 of the filter bed.

A series of laterally arranged rows of trough blocks 9 are laid upon the flat face 6' of the concrete bed 6, and for the purpose of the present invention, these blocks are made with a wide flat bottom wall 9' and relatively narrow flat top walls 9''. When these tile are laid end to end, they form a series of laterally spaced pier supports for the ends of grid blocks 10, which are transversely laid in adjacent rows upon the piers so as to bridge the trough 7 which is formed between them, each pier including the side by side top walls of two rows of trough blocks forming a support for the adjacent ends of the grid blocks of two rows.

For the particular purpose of the present invention, the trough tile are made of vitreous material, with the wide bottom wall formed full width of the tile for bearing upon the flat face of the concrete bed, and to facilitate the forming, drying and burning of the same, they may be provided with a plurality of longitudinal openings 11, which also serve to reduce the material and weight of the tile.

Between the narrow flat top walls 9'' of each trough block 9 a trough wall 9ª extends and is provided with a concave exterior surface for forming a trough 7.

The troughs 7 which are formed by the tile are thus given the proper concave cross section, which is necessary to insure the most efficient flow of the sewage effluent through and along the troughs.

It has heretofore been sought to provide spaced bearing supports for the ends of various kinds of floor brick by forming a series of spaced piers of concrete upon the concrete bed, but this practice encounters the difficulty in forming the bearing top of such a rib without a sufficiently uniform flat surface for properly supporting the ends of the floor brick, accompanied by a breaking or fracture of the edges of the bearing surface.

A further difficulty is experienced when concrete or other kinds of piers are made with straight upright sides forming a normal angle at the base of each side of the pier, which is objectionable in a sewage drainage trough because of the accumulation and adhesion of suspended solids and organic growths therein.

By forming spaced supporting piers of series of trough tiles made as described herein, the same can be readily laid, one at a time, upon the flat face of the concrete bed, by the use of a thin layer of cement mortar in case of need; so that the narrow tops 9" of the trough tiles will form a continuous and uniform flat bearing support for the ends of the grid blocks, which can be laid directly upon the bearing tops of the trough tiles without the necessity of using any mortar for leveling up the bearing surface of the spaced piers.

Each grid block 10 is preferably made with flat faces and upright end walls 10ª at each end, and a plurality of upright longitudinal walls 10ᵇ and 10ᵇ′ and 10ᵇ″ extending between the end walls, and spaced apart so as to form a slotted longitudinal opening 10′ between adjacent longitudinal walls.

The preferred form of making the grid blocks is to locate one of the longitudinal walls 10ᵇ flush with the ends of the end walls 10ª, and to locate another one of the longitudinal walls 10ᵇ″ at an interval within the other end of the end walls 10ª equal to the space between adjacent longitudinal walls, as shown in Fig. 3, so that when a series of grid blocks are laid side by side upon the trough blocks, a flat floor is formed with a uniform series of slotted openings 10′ between the longitudinal walls extending across the trough below, as shown in Fig. 2.

The width of the slotted openings 10′ is such as to prevent the larger pieces of drainage material 12 from passing through the same, so that the lower layer of filtering material 12 is properly supported upon the floor, while the smaller pieces 13 of the filtering material are properly supported on the larger pieces thereof; through all of which the sewage effluent may be filtered in well known manner.

As shown in Fig. 1, a series of supply pipes 14 may be built in concrete standards 15, from which a series of riser pipes 14′ may extend upward with suitable nozzle 16 on their ends for properly spraying a supply of sewage effluent upon the filter bed, in well known manner. When this construction is used, the concrete piers 15 are provided with suitable passages or ports 15′ in line with the troughs 7, so as not to stop the flow of purified effluent through and along the same.

For the purpose of the present invention, the grid blocks 10 like the trough tile 9, are made of a vitreous material, as for instance of vitrified shale, or fire clay, so as to present a smooth glassy surface upon which suspended solids and organic growths will not accumulate or adhere, upon a body which will not anchor fungous growth or be disintegrated by ordinary physical reaction or the chemical reaction of the sewage.

When made in the manner and of the material described herein, the floor construction under a trickling filter can be used continuously for a long series of years, without removing the filtering material for cleaning the openings in the floor and drainage structure.

I claim:

1. A hollow trough tile for a trickling filter floor made of vitreous material and formed with a flat wide base wall, side walls extending upward from the side edges of the base wall, top walls extending inward from the top edges of the side walls, and a concave trough wall extending continuously between the top walls.

2. A hollow trough tile for a trickling filter floor made of vitreous material and formed with a flat wide base wall, side walls extending upward from the side edges of the base wall, relatively narrow top walls extending inward from the top edges of the side walls, and a concave trough wall extending continuously between the top walls.

3. A hollow trough tile for a trickling filter floor made of vitreous material and formed with a flat wide base wall, side walls extending upward from the side edges of the base wall, relatively narrow flat top walls extending inward from the top edges of the side walls, and a concave trough wall extending continuously between the top walls.

4. A trickling filter floor made of hollow trough tiles having flat wide base walls, side walls extending upward from the side edges of the base walls, top walls extending inward from the top edges of the side walls, and a concave trough wall extending continuously between the top walls, the tile being laid end to end and side by side, the adjacent top walls forming supporting piers and the concave trough walls forming intervening troughs between the supporting piers, and grid blocks laid on the piers and spanning the troughs between them.

5. A trickling filter floor including a flat face concrete bed, series of hollow vitreous tiles laid end to end and side by side to form supporting piers and intervening troughs, the bottoms of the tiles being formed of wide flat base walls to bear full width of the tile upon the flat face of the concrete bed, side walls extending upward from the side edges of each base wall, top walls extending inward from the top edges of each side wall to form with adjacent tile top walls the pier tops, a concave trough wall extending continuously between the top walls of each tile to form the troughs, and flat face vitreous grid blocks laid on the piers spanning the troughs between the piers and forming a flat floor.

6. A trickling filter floor including a flat face concrete bed, series of hollow vitreous tiles laid end to end and side by side to form supporting piers and intervening troughs, the bottoms of the tiles being formed of wide flat base walls to bear full width of the tile upon the flat face of the concrete bed, side walls extending upward from the side edges of each base wall, top walls extending inward from the top edges of each side wall to form with adjacent tile top walls the pier tops, a concave trough wall extending continuously between the top walls of each tile to form the troughs, and flat face vitreous grid blocks laid on the piers spanning the troughs between the piers and forming a flat floor, there being series of slotted openings in the grid blocks extending across the troughs formed by the pier tiles below said grid blocks.

In testimony that I claim the above, I have hereunto subscribed my name.

JAMES G. BARBOUR.